(12) United States Patent
Spiegel

(10) Patent No.: US 9,026,943 B1
(45) Date of Patent: *May 5, 2015

(54) APPARATUS AND METHOD FOR SINGLE ACTION CONTROL OF SOCIAL NETWORK PROFILE ACCESS

(71) Applicant: Snapchat, Inc., Venice, CA (US)

(72) Inventor: Evan Spiegel, Venice, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,260

(22) Filed: Jul. 7, 2014

Related U.S. Application Data

(63) Continuation of application No. 13/672,654, filed on Nov. 8, 2012, now Pat. No. 8,775,972.

(51) Int. Cl.
*G06F 3/048* (2013.01)
*H04L 29/06* (2006.01)

(52) U.S. Cl.
CPC ...................................... *H04L 63/10* (2013.01)

(58) Field of Classification Search
CPC . G06F 3/0484; G06F 17/30867; G06F 3/048; G06F 9/4451; G06F 17/30274; G06F 17/30716; G06F 17/30994; G06F 2203/04803; G06F 3/04847; G06F 3/04855; H04L 67/306; H04L 41/22; H04L 12/585; H04L 51/12; G06Q 50/01; Y10S 715/974; Y10S 715/973; H04Q 2213/13109; H04M 2203/6009; H04M 3/42068; H04W 12/02
USPC .......................................... 715/747, 833, 974
See application file for complete search history.

(56) References Cited

U.S. PATENT DOCUMENTS

| | | | | |
|---|---|---|---|---|
| 8,775,972 | B2 * | 7/2014 | Spiegel | 715/833 |
| 2011/0320373 | A1 * | 12/2011 | Lee et al. | 705/319 |
| 2012/0210244 | A1 * | 8/2012 | de Francisco Lopez et al. | 715/747 |
| 2013/0185131 | A1 * | 7/2013 | Sinha et al. | 705/14.27 |
| 2014/0129953 | A1 * | 5/2014 | Spiegel | 715/741 |

* cited by examiner

*Primary Examiner* — Shen Shiau
(74) *Attorney, Agent, or Firm* — Cooley LLP

(57) ABSTRACT

A computer implemented method includes allowing a user to access a user-controlled social network profile page with posts in a specified order. A user is permitted to traverse an interface element across the specified order to establish a set position for the interface element. Access to posts is provided on a first side of the set position to define a viewable profile. Access to posts is blocked on a second side of the set position to define a non-viewable profile.

4 Claims, 8 Drawing Sheets

APPARATUS AND METHOD FOR SINGLE ACTION CONTROL OF SOCIAL NETWORK PROFILE ACCESS

CROSS REFERENCE TO RELATED APPLICATIONS

This application is a continuation of U.S. patent application Ser. No. 13/672,654 filed Nov. 8, 2012, the contents of which are incorporated herein by reference.

FIELD OF THE INVENTION

This invention relates generally to communications in computer networks. More particularly, this invention relates to single action control of social network profile access.

BACKGROUND OF THE INVENTION

A social network service is an online service, platform or site that facilitates the building and maintenance of social relations among individuals. Each member of a social network service maintains a profile with user information and user posts, which may be comments, photographs, videos, endorsements and the like. The posts may be from the user and/or individuals that the user is affiliated with in the social network. In this way, social network sites allow users to share ideas, activities, events and interests with affiliated individuals.

Privacy is a growing concern with social networks. Information posted by a user or an affiliated individual may be distasteful or become outdated. The user may desire to restrict access to certain information on their profile while allowing access to other information. While most social networks have configurable privacy control settings, such privacy control settings may be hard to find and in many instances they are confusing, resulting in an unintended access to information. Given that users are generally able to see all of the content that they have contributed to their profile, it can be difficult to determine what content is visible to others and what is visible only to the user.

Accordingly, improved techniques for controlling social network profile access are desirable.

SUMMARY OF THE INVENTION

A computer implemented method includes allowing a user to access a user-controlled social network profile page with posts in a specified order. A user is permitted to traverse an interface element across the specified order to establish a set position for the interface element. Access to posts is provided on a first side of the set position to define a viewable profile. Access to posts is blocked on a second side of the set position to define a non-viewable profile.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
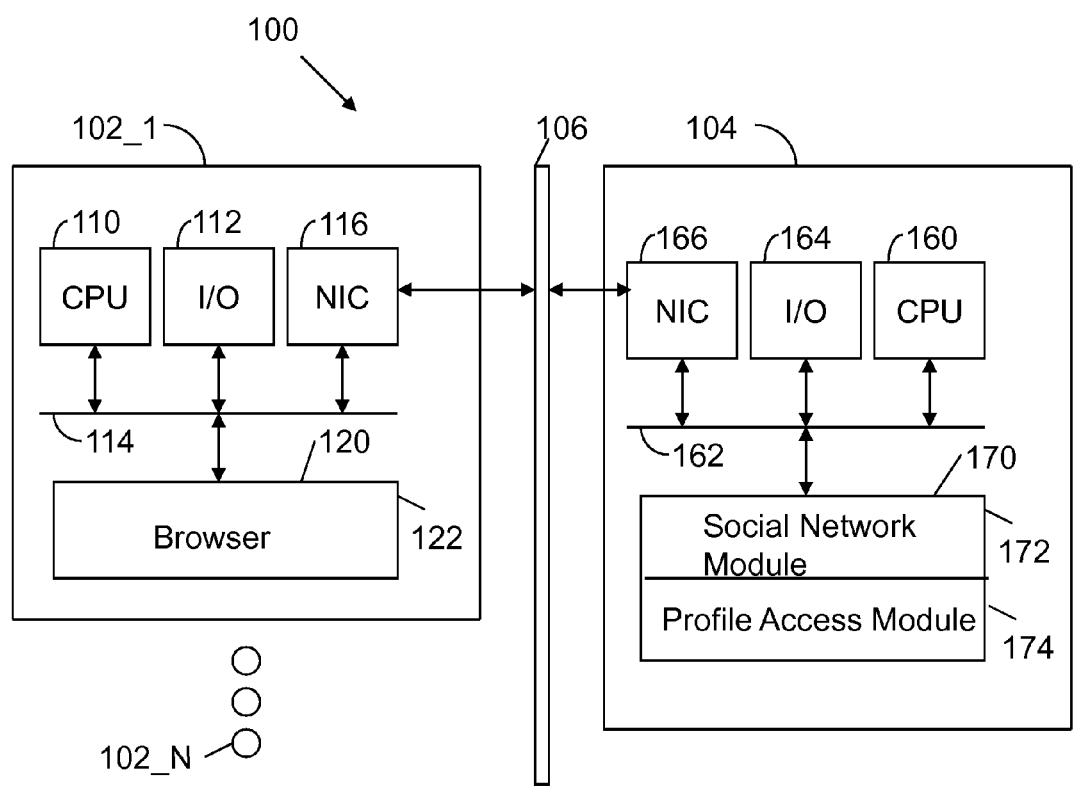
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106, which may be any wired or wireless network.

Each client device 102 may be a computer, tablet, Smartphone and the like with standard components, such as a central processing unit 110 connected to input/output devices 112 via a bus 114. The input/output devices 112 may include a touch display, keyboard, mouse and the like. A network interface circuit 116 is also connected to the bus 114 to provide connectivity with network 106.

A memory 120 is also connected to the bus 114. The memory 120 stores standard components, such as a browser 122, which allow one to access a social network site, such as a social network site hosted on server 104. Server 104 also includes standard components, such as a central processing unit 160 connected to input/output devices 164 via a bus 162. A network interface circuit 166 is also connected to the bus 162. Further, a memory 170 is connected to the bus 162. The memory 170 stores modules of executable instructions to implement disclosed operations. For example, the memory 170 may store a social network module 172, which supports standard social network operations, such as hosting profile pages, maintaining social graphs for individual users and facilitating communication between the individual users.

The memory 170 also stores a profile access module 174. The profile access module 174 includes executable instructions to implement operations of the invention. In particular, the profile access module 174 includes executable instructions to allow a user to manipulate an interface element to establish single action control of social network profile access. The interface element may be any object (e.g., bar, line, circle) that partitions one set of information from another set of information.

Figure 2:
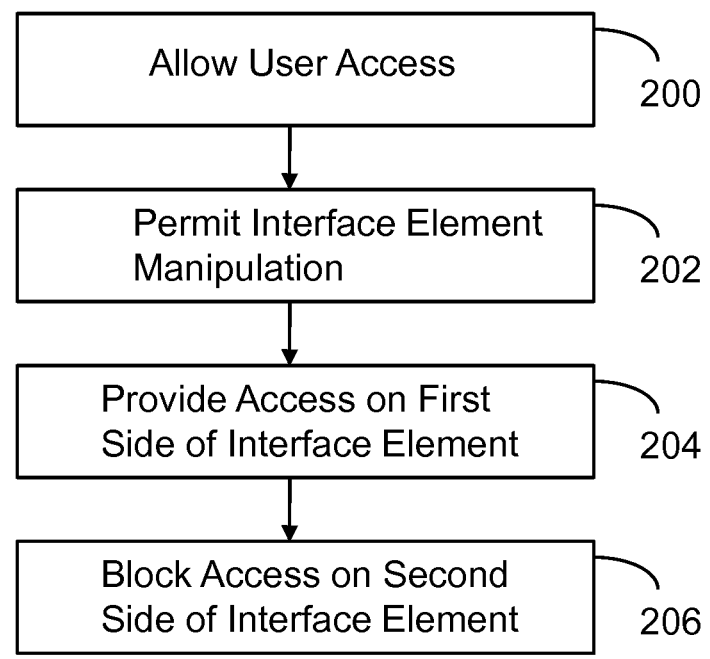
FIG. 2 illustrates processing operations associated with an embodiment of the invention.

FIG. 2 illustrates processing operations associated with an embodiment of the profile access module 174. Initially, a user is allowed access to a user-controlled social network profile page 200. For example, a client device 102 may access the social network module 172 of the server 104. In response, the server 104 supplies to the client a user-controlled social network profile page.

Figure 3:
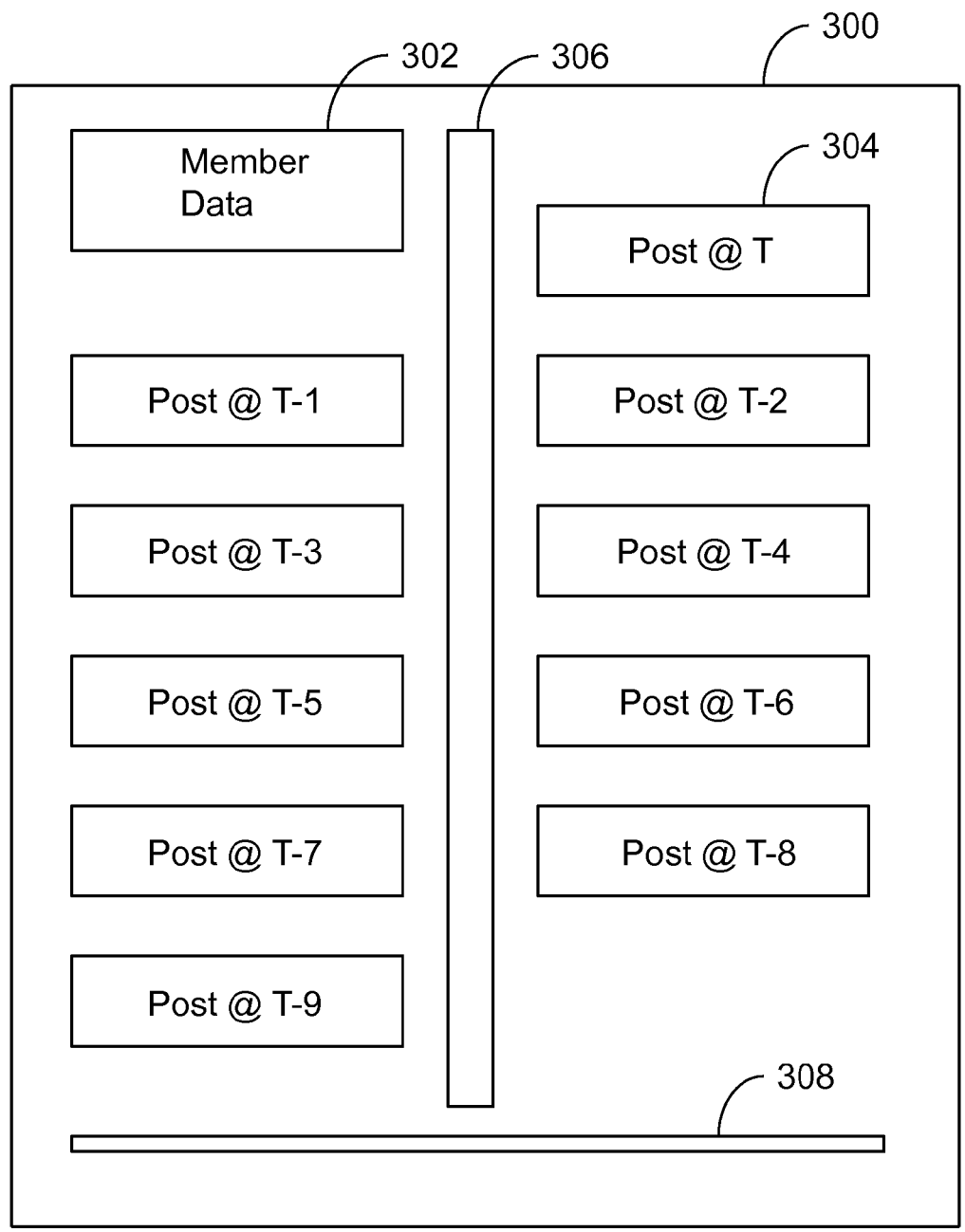
FIG. 3 illustrates a profile page with a single action interface element utilized in accordance with an embodiment of the invention.

FIG. 3 illustrates a user-controlled social network profile page 300, which may be displayed on a client device. The profile page 300 includes member data 302. The member data 302 may specify the member's name, biographic information, interests and the like. In one embodiment of the invention, the member data 302 is in a fixed position such that it is always viewable.

The profile page 300 also includes posts 304 in a specified order, in this case along a temporal axis 306. In this example, there are 10 posts. The latest post is "Post@T", while earlier posts are marked "Post@T-1" through "Post@T-9". FIG. 3 also illustrates an interface element 308. In this case, the interface element is referred to as a privacy bar.

Figure 4:
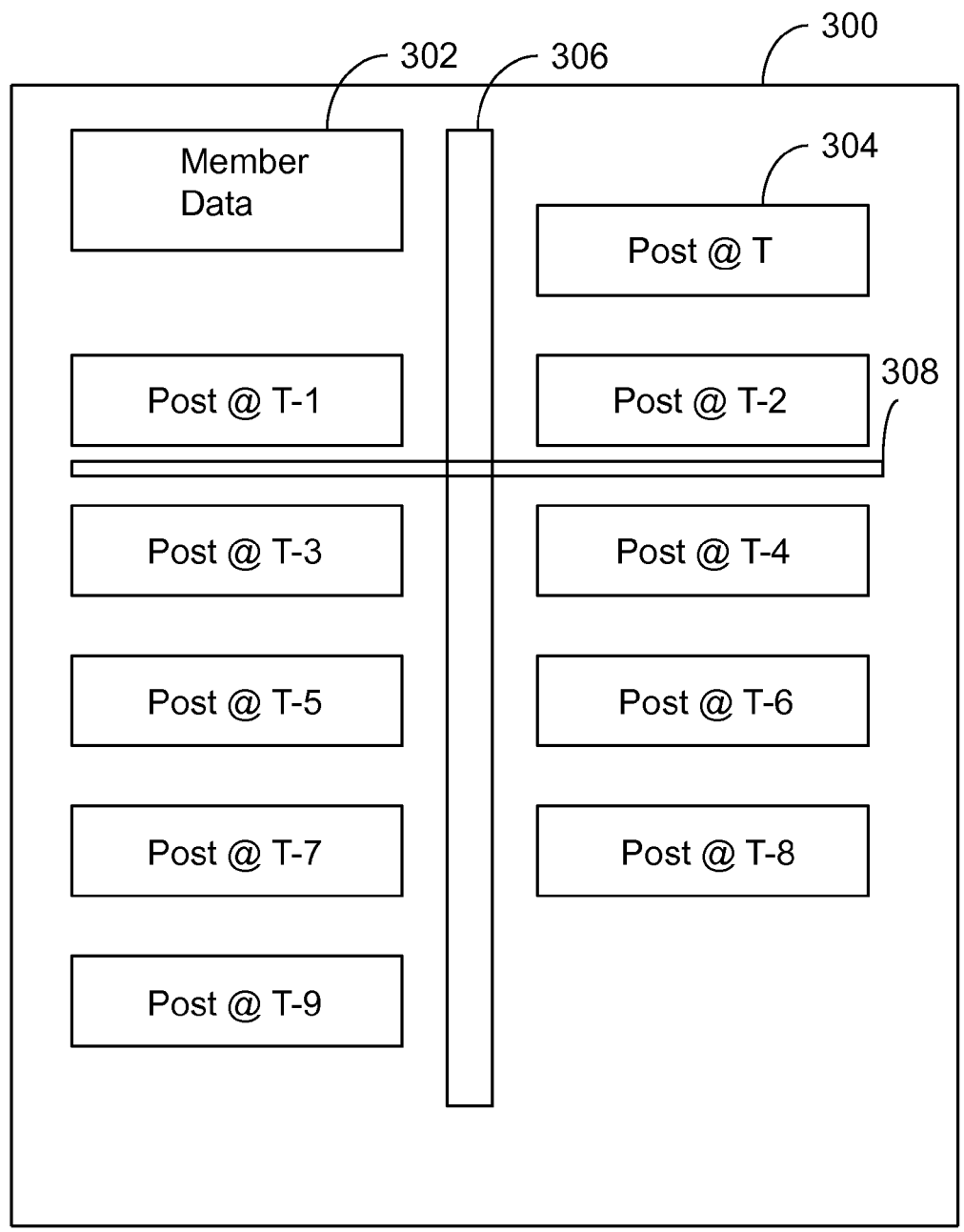
FIG. 4 illustrates a profile page with a re-positioned interface element.

Returning to FIG. 2, the next operation performed by the profile access module 174 is to permit the interface element to be manipulated 202. For example, the interface element 308 may be dragged with a single action gesture applied to a touch display of the client device. Alternately, the interface element 308 may be manipulated through a single action mouse stroke or keyboard stroke. The interface element 308 is manipulated along the temporal axis 306. As the interface element 308 is manipulated, the server 104 refreshes the profile page 300 displayed on the client device. FIG. 4 illustrates an example of a refreshed profile page with the interface element 308 at a new position. Observe that the user of the user-controlled social network profile page can still view posts on either side of the interface element 308. However, members of the user's social network have limited post access. That is, as shown in FIG. 2, social profile access is provided on a first side of the interface element 204. In this example, social profile access is provided on top of the interface element 308. Access is blocked on the second side of the interface element 206. In this example, social profile access is blocked on the bottom of the interface element.

Figure 5:
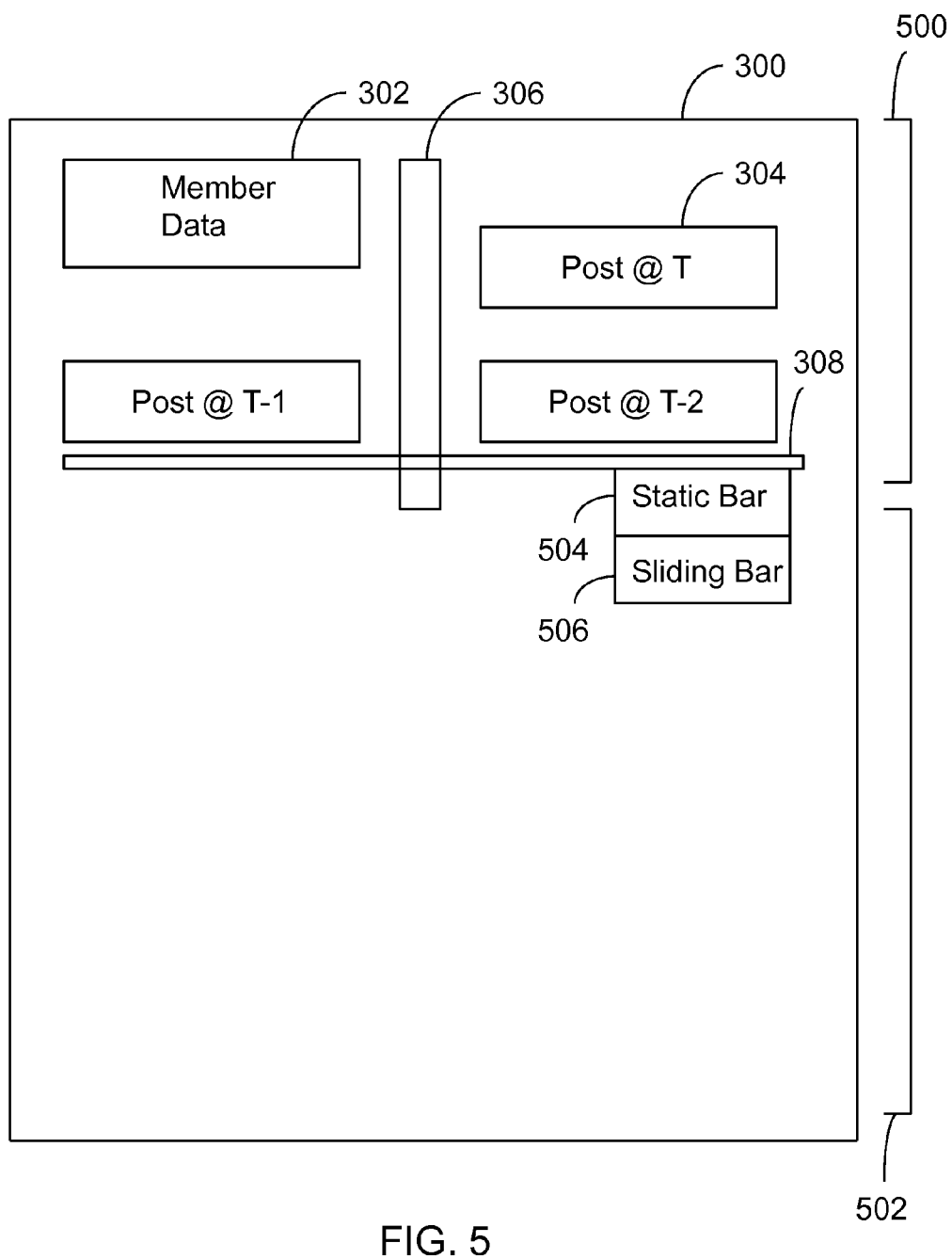
FIG. 5 illustrates a profile page with that provides selective profile information in accordance with an embodiment of the invention.

FIG. 5 illustrates this functionality. In particular, FIG. 5 illustrates the provision of access to posts on the first side of the bar position to define a viewable profile 500. FIG. 5 also illustrates the blocking of access to posts on a second side of the bar position to define a non-viewable profile 502.

The interface element 308 may include a configurable setting to establish the future position of the interface element 308. As shown in FIG. 5, a user may select a static interface element 504 or a sliding interface element 506. The system may have a default to one option or the other. In the case of a static bar, as time advances the viewable profile expands. That is, the currently viewable posts "Post@T", Post@T-1" and "Post@T-2" would remain viewable and additional posts would be positioned on top of them in temporal order. In the case of a sliding bar, as time advances, the viewable profile maintains a static temporal window size. In this example, the viewable profile would include a temporal window size for three posts. Thus, as new posts arrive, an older post, such as "Post@T-2" would slide into the non-viewable profile region 502 to make room for the new posts. In this way, a listing of all posts is maintained, but access to the posts is limited. Accordingly, a user can make those posts available at a later time, if desired, by moving the interface element 508 down the temporal axis 306.

Figure 6:
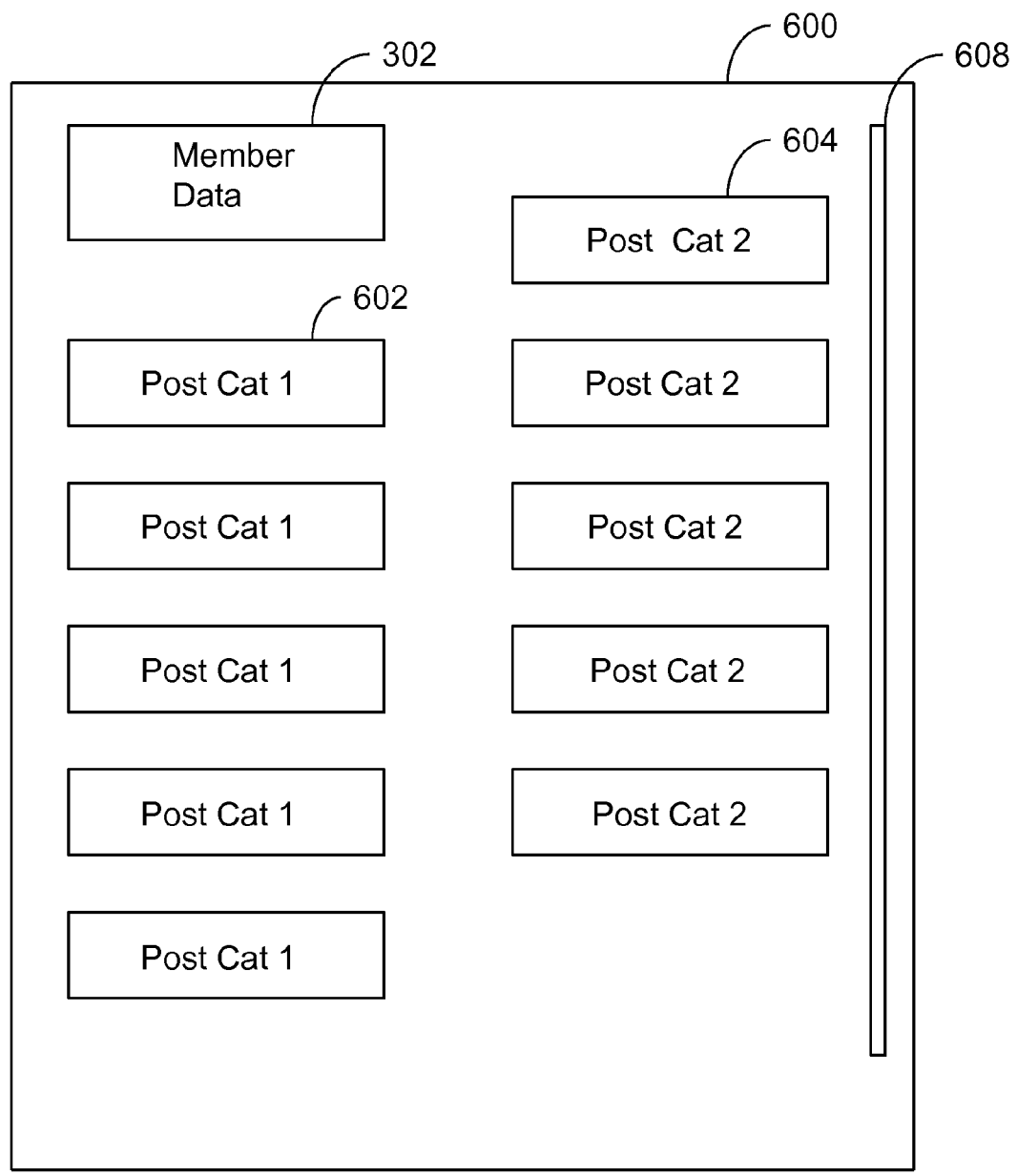
FIG. 6 illustrates a profile page ordered by category.
Figure 7:
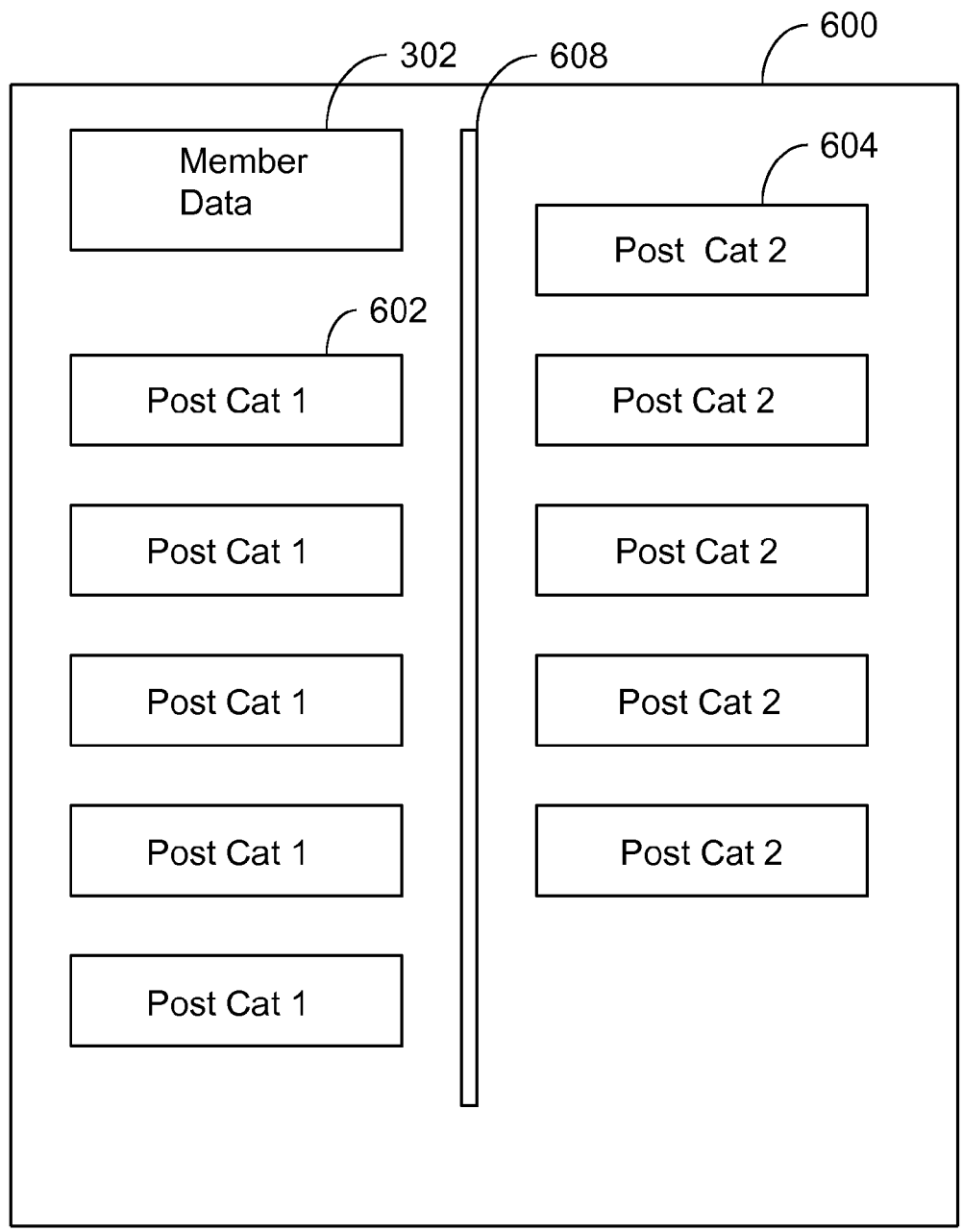
FIG. 7 illustrates the profile page of FIG. 6 with a re-positioned interface element.
Figure 8:
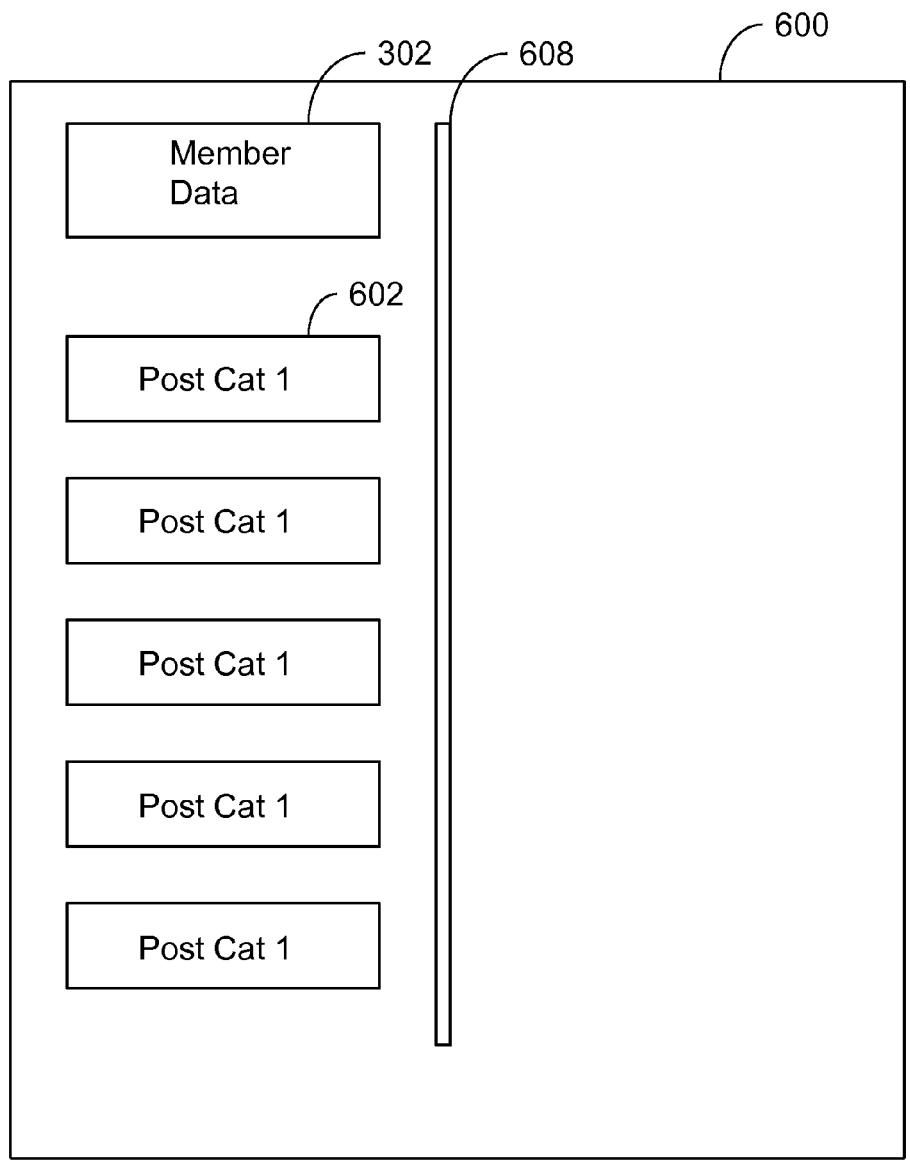
FIG. 8 illustrates the profile page of FIG. 5 with a set privacy control bar that provides selective profile information in accordance with an embodiment of the invention.

The processing operations of FIG. 2 may be applied to profile pages with different configurations. For example, FIG. 6 illustrates a profile page 600 with member data 302 and posts organized by category. In particular, there is a column of posts 602 in a first category and a column of posts 604 in a second category. The category may be established by content, sub-sets of social network members or other criteria. A vertical interface element 608 may be manipulated across category regions. FIG. 7 illustrates a re-positioned interface element 608. Again, the user observes posts on either side of the interface element 608. However, as shown in FIG. 8, members of the user's social network only see posts in the first category 602, while posts in the second category are blocked.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
    allowing a user to access a user-controlled social network profile page with posts in a specified order;
    permitting a user to traverse an interface element across the posts in the specified order to establish a set position for the interface element;
    providing access to posts on a first side of the set position for the interface element to define a viewable profile; and
    blocking access to posts on a second side of the set position for the interface element to define a non-viewable profile, wherein blocking access to posts includes blocking access to posts observed by social network members associated with the user, while the user has access to posts on the first side of the set position and the second side of the set position.

2. The computer implemented method of claim 1 wherein the viewable profile includes fixed information that remains in the viewable profile.

3. The computer implemented method of claim 1 wherein the specified order is along a temporal axis.

4. The computer implemented method of claim 1 wherein the specified order has category regions.

* * * * *